US008673415B2

(12) United States Patent
Servante et al.

(10) Patent No.: US 8,673,415 B2
(45) Date of Patent: Mar. 18, 2014

(54) PRINTABLE FILM

(75) Inventors: Alastain Hugh Servante, Carlisle (GB); Gary Power, Silloth (GB); Colin Marshall, Wigton (GB)

(73) Assignee: Innovia Films Limited, Wigton, Cumbria (GB)

( * ) Notice: Subject to any disclaimer, the term of this patent is extended or adjusted under 35 U.S.C. 154(b) by 0 days.

(21) Appl. No.: 13/206,232

(22) Filed: Aug. 9, 2011

(65) Prior Publication Data

US 2012/0135650 A1    May 31, 2012

Related U.S. Application Data

(63) Continuation of application No. 12/796,109, filed on Jun. 8, 2010, which is a continuation of application No. 10/969,901, filed on Oct. 22, 2004, now Pat. No. 7,758,965, and a continuation of application No. 09/117,214, filed as application No. PCT/BE97/00008 on Jan. 21, 1997, now abandoned.

(30) Foreign Application Priority Data

Jan. 25, 1996  (EP) ..................................... 96870004

(51) Int. Cl.
*B32B 27/36* (2006.01)
(52) U.S. Cl.
USPC .......... 428/35.7; 428/327; 428/201; 428/206; 428/336; 428/480
(58) Field of Classification Search
USPC .................. 430/270.1, 286.1; 428/32.71, 327
See application file for complete search history.

(56) References Cited

U.S. PATENT DOCUMENTS

| | | | | |
|---|---|---|---|---|
| 3,552,986 A | | 1/1971 | Bassemir et al. | |
| 4,003,751 A | * | 1/1977 | Carder | 524/813 |
| 4,456,679 A | * | 6/1984 | Leyrer et al. | 430/326 |
| 4,564,580 A | | 1/1986 | Ichimura et al. | |
| 4,592,953 A | | 6/1986 | Farrar et al. | |
| 4,822,828 A | | 4/1989 | Swofford | |
| 5,047,286 A | * | 9/1991 | Kaburaki et al. | 442/110 |
| 5,089,376 A | * | 2/1992 | Setthachayanon | 430/284.1 |
| 5,093,306 A | | 3/1992 | Mukoyoshi et al. | |
| 5,219,641 A | | 6/1993 | Mehta et al. | |
| 5,290,663 A | * | 3/1994 | Huynh-Tran | 430/284.1 |
| 5,372,984 A | * | 12/1994 | Yamauchi et al. | 503/200 |
| 5,391,429 A | * | 2/1995 | Otani et al. | 428/327 |
| 5,508,105 A | * | 4/1996 | Orensteen et al. | 428/32.71 |
| 5,563,205 A | | 10/1996 | Mayer et al. | |
| 5,585,416 A | | 12/1996 | Audett et al. | |
| 5,700,623 A | | 12/1997 | Anderson et al. | |
| 5,714,245 A | | 2/1998 | Atherton et al. | |
| 5,776,604 A | * | 7/1998 | Lu et al. | 428/343 |
| 6,569,949 B1 | | 5/2003 | Lee et al. | |

FOREIGN PATENT DOCUMENTS

| | | |
|---|---|---|
| DE | 41 32 484 | 2/1993 |
| EP | 0 142 331 | 5/1985 |
| EP | 0 202 812 | 11/1986 |
| EP | 0 209 359 | 1/1987 |
| EP | 0 410 051 | 1/1991 |
| EP | 0 454 379 | 10/1991 |
| EP | 0 588 534 | 3/1994 |
| EP | 0 588 724 | 3/1994 |
| EP | 96870004.7 | 1/1996 |
| EP | 0 716 929 | 6/1996 |
| GB | 1 042 520 | 9/1966 |

OTHER PUBLICATIONS

Dainippon Printing Co. Ltd. "Thermal Recording Method", Abstract of JP 62-162090, vol. 13, No. 177 (M-818) (3525) (1989).
Nippon Kogaku K.K. "Image Receiving Sheet for Sublimation-Transfer Recording and sublimation-Transfer Recording Method Using IT", Abstract of JP 61-76027, vol. 12, No. 98 (M-680) (2945)(1988).

* cited by examiner

*Primary Examiner* — Ellen S Raudenbush
(74) *Attorney, Agent, or Firm* — Ping Wang; Andrews Kurth, LLP

(57) ABSTRACT

The invention relates to printable films comprising a substrate and at least a surface layer, said layer covering at least one face of said substrate and comprising a water-dispersible polymer and an ethylenically unsaturated compound; to a process for the manufacture of such films; to printed films and especially to printed labels obtained from such printable films.

16 Claims, No Drawings

PRINTABLE FILM

FIELD

This application is a continuation application of U.S. patent application Ser. No. 12/796,109, filed on Jun. 8, 2010, which is a continuation application of U.S. patent application Ser. No. 10/969,901, filed on Oct. 22, 2004, now U.S. Pat. No. 7,758,965, which is a continuation application of U.S. patent application Ser. No. 09/117,214, filed on Jul. 24, 1998, now abandoned, which is a 371 of PCT/BE97/00008, filed on Jan. 21, 1997, which claims priority of European Application Number 96870004.7 filed on Jan. 25, 1996. The entirety of all of the aforementioned applications is incorporated herein by reference.

BACKGROUND

The present invention relates to an improved printable film having good ink adhesive properties and relates more particularly to an improved printable film having good adhesive properties when used with radiation curable ink.

In recent years, diversification of printed products has required printing on a wider variety of materials in sheets; for example, papers, synthetic papers, polymer films such as thermoplastic resin films, metallic foils, metallized sheets, etc. These printed items are printed by methods such as by offset printing, gravure, flexography, screen process printing and letterpress printing. In these printing methods, a method which uses radiation curable ink has recently become popular because radiation curable inks cure rapidly, and the printing method which uses radiation curable ink is of superior handling. Radiation curable inks are known to be useful in the printing of packaging, labels and non absorbing printing materials. Radiation curable printing inks typically contain unsaturated acrylates, polyesters, photoinitiators, and additives. In electron beam cured inks however, the photoinitiators may be omitted.

After deposition of the radiation curable ink on the printable item, the print is exposed to radiation and hardens within a fraction of a second. Printing speeds up to 300 m/min are attained during continuous printing. At present, there is a great demand for sheet-like printable items.

In printing methods, the printing sheet requires sheet running properties anti-blocking properties, producing uniform spread of the ink over the surface of the sheet, as well as antistatic properties. Besides these generally required properties, in printing methods which use radiation curable ink, the printing sheet requires in particular the property of adhering strongly to radiation cured ink.

In particular, radiation curable ink printed polymer films, intended for use as labels, for example in the bottle labelling market, should be resistant to both freezing water conditions (i.e. storage in coolers or ice buckets for 24 hours) and boiling water conditions (i.e. pasteurization by immersion in water at 95° C. for up to 1 hour).

European patent application EP-A1-410051 discloses printing sheets comprising a support layer and a surface layer on at least one face of said support, said surface layer containing at least an acrylate based polymer and an unsaturated compound (cinamic acid or derivatives thereof).

Neither this document, nor any other documents of the state of the art do teach anything about the possibility of use of other monomers to replace cinamic acid.

However, the above listed materials formed in sheets, especially polymer films do not sufficiently adhere to radiation curable ink after printing and curing, especially in these extreme conditions. Accordingly the printed and radiation cured ink has a problem in the fact that the printed and radiation cured ink separates from the polymer film.

Therefore, a printable film which has superior adhesion to the radiation curable ink, even in extreme conditions, is required.

DETAILED DESCRIPTION

The present invention has the above-described problems in mind, and an object of this invention is therefore to provide a printable film, particularly a printable polymer film, which has the superior properties required of printable films, and particularly has superior adhesive properties with radiation cured ink.

Accordingly, the present invention, provides a printable film comprising a substrate and at least a surface layer which covers at least one face of the substrate and which comprises a water dispersible polymer and an ethylenically unsaturated compound. In one embodiment, the surface layer comprises 10 to 98% by weight of a water dispersible polymer and 2 to 90% by weight of an ethylenically unsaturated compound.

Suitable substrates, which can be used in this invention, are polymer films, especially polyolefin films, papers, synthetic papers, woven fabrics, nonwoven fabrics, ceramic sheets, metallic plates, and multilayer composite sheets formed by combination of said materials. For printable film intended for use as labels, polyolefin films are preferred, especially oriented polypropylene films, and still more preferred is an oriented polypropylene film according to the European Patent Application 202812.

In the present specification, the expression "printable film" denotes a film which is capable to be directly inked, i.e. a film of which the surface layer is strong enough to resist the pull of the tacky ink, otherwise areas of the surface layer may be pulled away from the surface, giving a defect known as picking.

The expression "at least a surface layer" denotes a layer which covers at least one face of the substrate listed above. This surface layer comprises a water dispersible polymer, for example a water dispersible acrylic or urethane polymer. In the present specification, an "acrylic polymer" means a (co) polymer obtained by the free-radical addition polymerization of at least one (meth)acrylic type monomer and optionally of other vinylic or allylic compounds. It is essential that this acrylic polymer should be able to provide a smooth film-formed and reasonably open surface.

A wide variety of acrylic polymers are able to fulfill this requirement. Suitable acrylic polymers are homopolymers of (meth)acrylic acid or alkyl (meth)acrylate, the alkyl radical having 1 to 10 carbon atom, or copolymers of two or more of the said (meth)acrylic type monomer and optionally of other vinylic or allylic compounds.

As said above, a water dispersible urethane polymer may also suitably be used. As with the acrylic polymer, it is essential that this urethane polymer should be able to provide a smooth film-formed and reasonably open surface.

A wide variety of urethane polymers are able to fulfill this requirement. Suitable urethane polymers are for example the reaction product of an isocyanate-terminated polyurethane prepolymer formed by reacting at least an excess of an organic polyisocyanate, an organic compound containing at least two isocyanate-reactive groups and an isocyanate-reactive compound containing anionic salt functional groups (or acid groups which may be subsequently converted to such anionic salt groups) or non-ionic groups and an active hydrogen-containing chain extender.

The surface layer comprises also an ethylenically unsaturated compound.

The ethylenically unsaturated compound is selected to be miscible in the wet stage in the aqueous phase and to be compatible in the dry stage with the water dispersible polymer itself. Consequently, the ethylenically unsaturated compound acts as a plasticiser for the surface layer once hardened allowing the easy penetration of the radiation curable ink thereto.

The ethylenically unsaturated compound must also be able, when the printed film is submitted to radiations in order to cure the ink, to react with the unsaturated components of the ink which has penetrated into the surface layer.

This reaction between the ethylenically unsaturated compounds of the surface layer and the unsaturated compounds of the radiation curable ink forms chemical bonds between those compounds and simultaneously crosslinks the surface layer, thereby generating the final resistant product.

Preferably, the ethylenically unsaturated compound contains 1 to 10 ethylenical bonds per molecule and still more preferably 2 to 5 ethylenical bonds per molecule.

Suitable ethylenically unsaturated compounds are the ester derivatives of $\alpha,\beta$-ethylenically unsaturated acids, such as acrylic or methacrylic acids, itaconic or citraconic acids, maleic or fumaric acids, etc. with polyols or alkoxylated polyols.

The suitable polyols include saturated aliphatic diols such as ethylene glycol, diethylene glycol, triethylene glycol, propylene glycol, dipropylene glycol, tripropylene glycol, butylene glycols, neopentyl glycol, 1,3- and 1,4-butane diols, 1,5-pentane diol, 1,6-hexanediol and 2-methyl-1,3 propanediol. Glycerol, 1,1,1-trimethylolpropane, bisphenol A and its hydrogenated derivatives may also be used. The suitable alkoxylated polyols include the ethoxylated or propoxylated derivatives of the polyols listed above.

Examples of ethylenically unsaturated compounds which can be used according to the invention are polyfunctional acrylates such as difunctional acrylates, such as 1,4-butane diol diacrylate, 1,6-hexane diol diacrylate, neopentyl glycol diacrylate, triethylene glycol diacrylate, polyethylene glycol diacrylate, tripropylene glycol diacrylate, 2,2-dionol diacrylate, bisphenol A diacrylate, etc., trifunctional acrylates such as pentaerythritol triacrylate, trimethylolpropane triacrylate, etc. tetrafunctional acrylates, etc.

It is to be understood that the methacrylate derivatives corresponding to these acrylate derivatives could also be used.

Moreover, it has been found that polyallyl derivatives such as tetraallyloxyethane are also suitable. Preferably ethoxylated trimethylolpropane triacrylate (EBECRYL 1160 from UCB CHEMICALS) is used.

The amount of the ethylenically unsaturated compound can be of from about 2 to about 90% by weight of the acrylic polymer, and preferably is from about 2 to about 15% (in the present specification, all percentages are dry weight based).

In order to improve the hardness and/or water resistance of the surface layer deposited on the film and consequently, of the finished product, a crosslinking agent may advantageously be added to the surface layer. However, it is to be noted that such a crosslinking agent should be chosen so as the surface layer, once hardened, allows the easy penetration of the radiation curable ink thereto.

Coordinating metal ligands which can form stable coordinated structures with carboxy or carbonyl functionality perfectly fulfill this requirement. Ammonium zirconium carbonate (stabilized or not) is particularly preferred. The amount of the crosslinking agent can be up to 5% by weight of the acrylic polymer, and preferably is from 1 to 5% by weight of the acrylic polymer.

The surface layer can contain all other additional agents, if necessary, for preventing the blocking of one sheet to another, and for improving the sheet running property, antistatic property, nontransparency property, etc. These additional agents are generally added in a total amount not exceeding about 40% by weight of the acrylic polymer. As said additional agent, for example, a pigment such as polyethylene oxide, silica, silica gel, clay, talc, diatomaceous earth, calcium carbonate, calcium sulfate, barium sulfate, aluminium silicate, synthetic zeolite, alumina, zinc oxide, titanium oxide, lithopone, satin white, etc. and cationic, anionic and nonionic antistatic agents, etc. may be used.

According to the present invention, the surface layer may be applied as an aqueous dispersion at about 0.5 to about 2.5 $g/m^2$ on the substrate by the method of roll coating, blade coating, spray coating, air knife coating, rod bar coating, reverse gravure, etc. on the substrate and then dried, for example, in a hot air oven.

After the drying step, the surface layer comprises thus the water dispersible polymer, smoothly crosslinked by the crosslinking agent and, included in the acrylic polymer matrix, the ethylenically unsaturated compound.

As said above, this allows the easy penetration of the radiation curable ink into the surface layer as well as its subsequent reaction with the ethylenically unsaturated compound.

Before applying the surface layer, the surface of the substrate can be first pretreated in a conventional manner with a view to improve its adhesiveness. For this purpose, it is possible, for example, to pretreat the substrate by the corona effect but it should be understood that all known techniques aiming at improving the surface of a sheet-like item with a view of the application of a composition, may be suitable.

It has been observed that in certain cases, the surface layer contemplated herein do not adhere well to film surfaces even when the later have been subjected to well-known pretreatment operations such as, for example, treatment by corona discharge, flame, or oxidizing chemicals. It has been found, however, that the use of primers intermediate between the substrate and the surface layer provides a high level of adherence.

Indeed, in applying coating layer, to a polyolefin film substrate it is generally desirable first to apply an intermediate primer or anchor coating layer to the substrate to ensure adequate adhesion between the substrate and subsequently applied coating layer. Although a film according to the invention may be utilized as such a substrate per se (for example, a nonprimed printable film according to the invention is able to resist the freezing water conditions), it is preferred to utilise as a substrate for a subsequently applied layer a film to the receptive surface(s) of which has been applied a primer or anchor coating layer.

Advantageously, the film comprises thus further a primer layer between the substrate and the surface layer(s).

As examples of suitable primers, polyethylene imine or polyurethane acrylate primers crosslinked by isocyanate, epoxy, aziridine or silane derivatives may be cited.

The primer resin may be applied by conventional coating techniques, for example, by a gravure roll coating method. The resin is conveniently applied as a dispersion or as a solution. Economically it would be preferable to apply the resin as a dispersion in water. Aqueous dispersion techniques have the added advantage that there is no residual odour due to the solvent present which is generally the case when an organic solvent is used. However, when using aqueous techniques it is usually necessary to heat the film a higher temperature to dry off the dispersant than with systems using an organic solvent or dispersant. Furthermore, the presence of a surfactant, which is generally used to improve the dispersion of the coating in water, tends to reduce the adhesion between the resin and the base film. Thus, it is also possible to apply the resin from an organic solvent or dispersant. Examples of suitable organic solvent include alcohols, aromatic hydrocarbon solvents, such as xylene, or mixtures of such solvents as is appropriate.

A reverse face of the substrate, namely a face not covered by the surface layer, can be covered with a pressure-sensitive adhesive layer which consists of a commonly used pressure-sensitive adhesive agent. Furthermore, if necessary, a releasing film or sheet consisting of a releasing agent, can cover the pressure-sensitive adhesive layer. This laminate comprising the printing sheet according to the invention can be used as an adhesive label which may be affixed to most types of surface.

Another aspect of the invention concerns thus a printable film intended for labels comprising a substrate of which only one face is coated with a surface layer and of which the other face is coated with a pressure-sensitive adhesive layer which is itself covered with a releasing film or sheet.

Another aspect of the present invention relates to a process for the manufacture of a printable film comprising the step of coating at least one side of a substrate with an aqueous dispersion comprising a water dispersible polymer and an ethylenically unsaturated compound and optionally a crosslinking agent and/or conventional additives, and comprising further the step of drying the coating so obtained.

Advantageously, the process of manufacture of a printable film comprises before the step of coating at least one face of the substrate, a further pretreatment step of the substrate (such as corona discharge treatment) and still more advantageously a step of priming of the substrate with a primer.

In a particular embodiment directed to the preparation of labels, only one face of said substrate is coated with a surface layer and the one face-coated substrate so obtained is coated with a pressure-sensitive adhesive or in a variant, the pressure-sensitive adhesive may be transferred from a release liner with which the coated substrate is combined.

Another object of the present inventions concerns a printed film comprising a substrate of which at least one face is coated with a surface layer comprising a water dispersible polymer and an ethylenically unsaturated compound, said coated face of the substrate being printed by conventional methods such as offset printing, gravure, flexography, screen process printing and letterpress printing using radiation curable ink and subsequently radiation cured.

Ink formulations for radiation curing contains generally pigments, vehicle, solvent and additives. The solvents in these systems are low-viscosity monomers, capable of reacting themselves (i.e., used as reactive diluents). The vehicle is usually composed of a resin derived from unsaturated monomers, prepolymers or oligomers such as acrylates derivatives which are able to react with the ethylenically unsaturated compound of the surface layer. For a UV ink, the "additives" contain a large amount of photoinitiators which respond to the photons of UV light to start the system reacting.

A UV ink formulation may be generalized as:

| | |
|---|---|
| pigment | 15-20% |
| prepolymers | 20-35% |
| vehicle | 10-25% |
| photoinitiators | 2-10% |
| other additives | 1-5% |

For an electron beam curable ink, the "additives" contain generally no photoinitiator.

The low viscosity monomers, sometimes termed diluents, are capable of chemical reactions which result in their becoming fully incorporated into the ultimate polymer matrix.

The vehicle provides the "hard resin" portion of the formulation. Typically, these are derived from synthetic resins such as for example, urethanes, epoxides, polyesters which have been modified by reaction with compounds bearing ethylenic groups such as for instance (meth)acrylic acid, hydroxyethyl(meth)acrylate reaction product of caprolactone with unsaturated compounds bearing a hydroxyl group, and the like.

Appropriate adjustments could be made in the selection of the prepolymers and monomers used in order to achieve the required viscosities for the different methods of application.

Another aspect of the invention relates to a process for the manufacture of a printed film comprising the steps of a) coating a substrate with an aqueous dispersion comprising a water dispersible polymer and an ethylenically unsaturated compound;

b) drying the coating so obtained;

c) inking the dried coating with radiation-curable ink;

d) curing the ink with UV or EB radiations.

It is to be noted that the different steps of this process may be affected in the same conditions, such as speed and costs, as with conventional surface layer.

Finally, the invention concerns also a printed film as obtained by inking a printable film according to the invention, and especially a printed label so obtained.

The following Examples are given for the purpose of illustrating the present invention.

In these Examples, the determination of certain characteristic values was carried out in accordance with the methods described below.

The adhesion of the radiation cured ink to the film in boiling water conditions (simulating pasteurization) is controlled according to the following procedures.

(A) A stirred waterbath is heated to 95° C. Once the temperature remains stable, the sample of the printed film to be tested is immersed into the water. After 45 minutes, the sample is removed from the waterbath and scratched with moderate pressure with a coin held square to the surface of the sample. The loss of print is reported as "pass" or "fail" wherein "pass" means no loss of print and "fail" means noticeable loss of print.

(B) The sample is removed from the waterbath at 95° C. after 45 minutes as described in A.

An adhesive tape is applied on the sample and then the adhesive tape is quickly removed. In this way, the properties of the ink which is printed on the printing sheet are observed.

The surface percentage of ink removed (visual estimation) is reported.

The adhesion of the radiation cured ink to the film in freezing water conditions (simulating ice chest immersion) is controlled according to the following procedure.

A waterbath containing a mixture of ice and water (50:50) is cooled to 0° C. Once the temperature remains stable, the sample of the printed film to be tested is immersed into the water.

After 24 hours, the sample is removed from the waterbath and scratched with moderate pressure with a coin held square to the surface of the sample. The loss of print is reported as "pass" or "fail" in the same manner as described above.

Example 1

A corona discharge treated polypropylene film of 50 mm thickness is primed on one face at 0.2 g/m² with a polyurethane acrylate to which an isocyanate crosslinker is added prior to coatings. The primed face of the substrate is subsequently overcoated, at 1.0 g/m² and by reverse gravure, with an aqueous dispersion containing 21.0 kg of an aliphatic polyester based polyurethane (DAOTAN VTW 1238 from HOECHST; solids content 50%) which represents 80.8% (dry weight) of the aqueous dispersion, 0.9 kg of tripropylene glycol diacrylate (solids content 100%; 7% (dry weight) of the aqueous dispersion), 1.1 kg of ammonium zirconium carbonate (solids content 20%; 1.7% (dry weight) of the aqueous dispersion), 4.3 kg of colloidal silica (LUDOX HS40 from DU PONT; solid content 30%; 10% (dry weight) of the aqueous dispersion) and 0.65 kg of silica gel as antiblocking agent (GASIL HP 250 from CROSFIELD; solids content 10%; 0.5% (dry weight) of the aqueous dispersion).

The coated film is then dried in a hot air oven.

The coated film so obtained is then printed in a screen printing process with RSP series ink (from NORCOTE), at 12 g/m².

The printed film so obtained is then UV cured with a medium pressure mercury vapour lamp (120 W/cm) at 12.2 m/min.

The printed film finally obtained is tested according to the method given above. The results are reported in Table 1.

Comparative Example A

A corona discharge treated polypropylene film (but not primed) of 50 mm thickness, is printed and then cured as described in Example 1.

The printed film finally obtained is tested according to the method given above. The results are reported in Table 1.

Comparative Example B

A printed film is prepared exactly as described, at Example 1, except that the aqueous dispersion does not contain tripropylene glycol diacrylate.

The printed film finally obtained is tested according to the method given above. The results are reported in Table 1.

TABLE 1

| Example Scratch test | Boiling water condition % ink removal | Freezing water condition Scratch test |
|---|---|---|
| I | Pass | 0% | Pass |
| A* | Fail | 95% | Fail |
| B* | Fail | 60% | Fail |

*by way of comparison

These results show that the printable film according to the invention produces highly desirable properties with respect to adhesion of the radiation curable ink to the substrate. Especially, the influence of the presence of the surface layer may be noted from the comparison between examples A and B and the influence of the ethylenically unsaturated compound may be noted from the comparison between examples B and 1.

Example 2

A printed film is prepared exactly as described at example 1, except that the ethylenically unsaturated compound is replaced with triacrylate of ethoxylated trimethylpropane (EBECRYL 1160 from UCB, S.A.).

Example 3

A printed film is prepared exactly as described at example 1, except that the urethane polymer is replaced with an anionic acrylic polymer (NEOCRYL XK-90 from ZENECA).

Examples 4 to 6

Printed films are prepared exactly as described at example 2, except that the urethane polymer is replaced respectively with an anionic acrylic polymer (NEOCRYL XK-90 from ZENECA) (example 4), with a styrene acrylic copolymer (GLASCOL LE 31 from ALLIED COLLOIDS) (example 5) and with another anionic acrylic polymer (NEOTAC A-572 from ZENECA) (example 6).

The printed films obtained at examples 2 to 6 are tested according to the method given above and the results are reported in Table 2.

TABLE 2

| | Boiling water condition | | Freezing water condition |
|---|---|---|---|
| Example | Scratch test | % ink removal | Scratch test |
| 2 | Pass | 0 | Pass |
| 3 | Pass | 0 | Pass |
| 4 | Pass | 0 | Pass |
| 5 | Pass | 0 | Pass |
| 6 | Pass | 0 | Pass |

These results show that a wide variety of surface layer and ethylenically unsaturated compounds may be used.

What is claimed is:

1. A printable film, comprising:
   a substrate;
   a surface layer covering a face of said substrate,
   wherein said surface layer comprises:
      10 to 98% by weight of a water dispersible polymer that provides a smooth film surface for printing; and
      2 to 90% by weight of an ethylenically unsaturated compound that plasticizes said surface layer,
   wherein said surface layer is printable with radiation curable ink and wherein said surface layer further comprises a cross-linking agent in an amount from 1 to 5% by weight of the water dispersible polymer and does not contain a polymerization photoinitiator and said ethylenically unsaturated compound does not react with said water-dispersible polymer when said surface layer is irradiated with UV radiation.

2. The printable film of claim 1, wherein the substrate is selected from the group consisting of polymer films, polyolefin films, papers, synthetic papers, woven fabrics, nonwoven fabrics, ceramic sheets, metallic fiber sheets, metalized sheets (film), metallic foils, metallic plates, and multilayer composite sheets formed by combination of said materials.

3. The printable film of claim 2, wherein the substrate is an oriented polypropylene film.

4. The printable film of claim 1, wherein said water dispersible polymer forms a matrix and wherein said ethylenically unsaturated compound is included in said matrix and is present in an amount from 2% to 15% by weight of the water dispersible polymer.

5. The printable film of claim 1, wherein said ethylenically unsaturated compound is an ester derivative of an α,β-ethylenically unsaturated acid with a polyol or alkoxylated polyol.

6. The printable film of claim 5, wherein said α,β-ethylenically unsaturated acid is selected from the group consisting of acrylic acids, methacrylic acids, itaconic acids, citraconic acids, maleic acids, and fumaric acids.

7. The printable film of claim 1, wherein said ethylenically unsaturated compound contains 1 to 10 ethylenical bonds per molecule.

8. The printable film of claim 1, wherein said ethylenically unsaturated compound contains 2 to 5 ethylenical bonds per molecule.

9. The printable film of claim 1, wherein said water dispersible polymer comprises a homopolymer of (meth)acrylic acid, or alkyl (meth)acrylate with the alkyl radical having 1 to 10 carbon atoms.

10. The printable film of claim 1, wherein said water dispersible polymer comprises a copolymer of (meth)acrylic acid and alkyl (meth)acrylate with the alkyl radical having 1 to 10 carbon atoms.

11. The printable film of claim 1, wherein said water dispersible polymer comprises a copolymer of vinylic or allylic compounds.

12. The printable film of claim 1, wherein the water dispersible polymer comprises a urethane or urethane acrylate polymer.

13. The printable film of claim 1, wherein said crosslinking agent comprises ammonium zirconium carbonate.

14. The printable film of claim 1, wherein said water dispersible polymer is a urethane polymer which is not a polyurethane acrylate and wherein said urethane polymer provides a smooth film surface for printing.

15. The printable film of claim 1, wherein said surface layer comprises a radiation curable ink.

16. The printable film of claim 1, wherein said surface layer comprises an electron beam curable ink.

\* \* \* \* \*